Patented Dec. 29, 1936

2,065,900

UNITED STATES PATENT OFFICE 2,065,900

DIHYDROXYSTILBENE-DICARBOXYLIC ACID AND A PROCESS OF PREPARING IT

Leopold Laska and Oskar Haller, Offenbach-on-the-Main, Germany, assignors to General Aniline Works, Inc., New York, N. Y., a corporation of Delaware No Drawing. Application March 18, 1936, Serial No. 69,595. In Germany March 23, 1935

2 Claims. (Cl. 260—111)

This invention relates to a dihydroxystilbene-dicarboxylic acid and to a process of preparing it; more particularly it relates to a compound of the following probable formula:

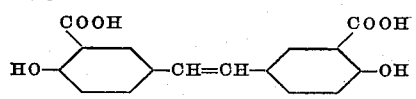

We have found that a uniform dicarboxylic acid of dihydroxystilbene is obtainable by heating the alkali metal salts of the dihydroxystilbene of the constitution:

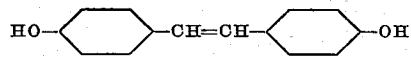

with carbon dioxide under high pressure.

The new acid gives in alcoholic solution a characteristic blue coloration on the addition of a dilute ferric chloride solution. This proves that the carboxylic acid groups have entered in ortho-position to the OH-groups. This smooth course of reaction with formation of an individual dicarboxylic acid of dihydroxystilbene which has, hitherto, not been described in the literature could not be foreseen since dihydroxy compounds often yield mixtures of mono- and di-carboxylic acids. Moreover, the capability of reacting of the ortho-position to the hydroxyl group is often diminished in the synthesis of salicylic acids by the presence of an α, β-unsaturated side chain in para-position so that the operativeness of the present process must be regarded as surprising.

The new dihydroxystilbene-dicarboxylic acid is a valuable intermediate product for the manufacture of dyestuffs.

The following examples serve to illustrate the invention, but they are not intended to limit it thereto, the parts being by weight:

(1) 212 parts of 4, 4'-dihydroxystilbene are dissolved in an autoclave, provided with a stirrer, with 112 parts of potassium hydroxide and 1000 parts of water. The water is then distilled off, finally under reduced pressure, until the di-potassium salt formed is entirely dry. After cooling, carbon dioxide is introduced into the reaction vessel while increasing the pressure to about 110 to about 120 atmospheres, the whole is heated to 170° C. and heating is continued under this pressure for 12 hours. The melt is allowed to cool and then dissolved in water, the solution is filtered and the carboxylic acid is precipitated from the filtrate by means of hydrochloric acid. By dissolving and re-precipitating from a solution of sodium acetate small quantities of resin are removed. The new acid which is obtained with a yield of 65% of the theoretical crystallizes from quinoline in the form of a sandy feebly yellowish powder which melts at 350° C. to 355° C. with decomposition. It gives in alcoholic solution the coloration characteristic of ortho-hydroxycarboxylic acids on addition of a few drops of a dilute ferric chloride solution.

(2) 212 parts of 4, 4'-dihydroxystilbene are dissolved in an autoclave, provided with a stirrer, with 80 parts of sodium hydroxide and 1000 parts of water. After elimination of the water, carbon dioxide is introduced into the reaction vessel which contains the completely dry cold disodium salt while increasing the pressure to 120 atmospheres. The whole is heated to 170° C. and heating is continued under this pressure for 12 hours. The reaction product is worked up in the manner described in Example 1. The dicarboxylic acid obtained with a yield of 60% of the theoretical has the same properties as that obtained according to the preceding example.

We claim:

1. The process which comprises heating the alkali metal salts of 4, 4'-dihydroxystilbene with carbon dioxide under a pressure of about 110 to about 120 atmospheres.

2. The compound of the following formula:

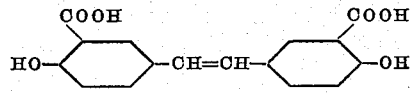

crystallizing from quinoline in the form of a sandy feebly yellowish powder which melts at 350° C.–355° C. with decomposition.

LEOPOLD LASKA.
OSKAR HALLER.